R. S. RUSH.
NUT LOCK.
APPLICATION FILED MAY 14, 1908.
No. 905,235.
Patented Dec. 1, 1908.
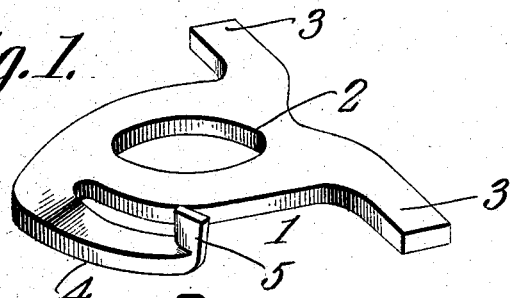
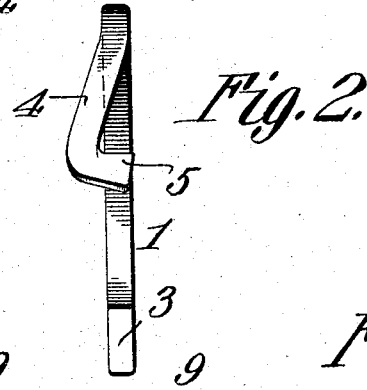
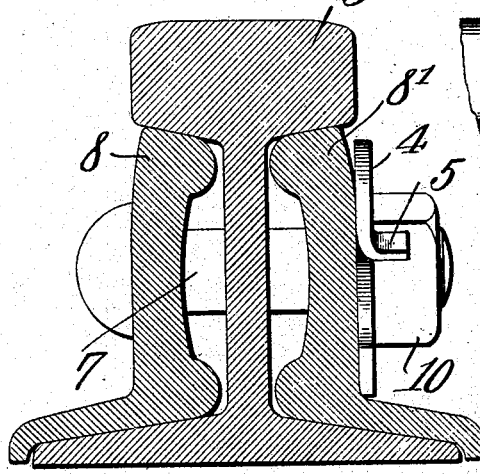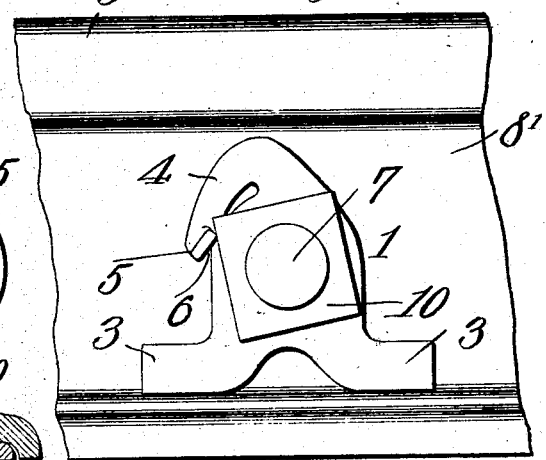
Witnesses
E. T. Stewart
E. W. Cady
Inventor
Robert S. Rush.
By C. A. Snow & Co
Attorneys

UNITED STATES PATENT OFFICE.

ROBERT S. RUSH, OF LAKE, MISSISSIPPI.

NUT-LOCK.

No. 905,235.     Specification of Letters Patent.     Patented Dec. 1, 1908.

Application filed May 14, 1908. Serial No. 432,940.

*To all whom it may concern:*

Be it known that I, ROBERT S. RUSH, a citizen of the United States, residing at Lake, in the county of Scott and State of Mississippi, have invented a new and useful Nut-Lock, of which the following is a specification.

This invention relates to nut locks, and has especial reference to nut locks in which a washer is employed, and so constructed as to permit the nut to ride over it while the nut is being screwed on to a bolt, and which will automatically engage and lock the nut and prevent it from becoming loose.

The invention has for its object to provide an improved nut lock of this kind which is simple in construction, easily applied, effective and durable in use, and which may be readily removed.

The invention consists of an improved nut lock, constructed and arranged as hereinafter set forth and claimed.

Referring to the drawing, Figure 1 is a view in perspective of a washer constructed in accordance with this invention. Fig. 2 is side or edge view thereof. Fig. 3 is a view in cross-section of a rail joint showing the nut lock in use. Fig. 4 is a face view thereof.

In carrying out the invention, a metal washer 1 is provided, formed with the bolt hole 2, the legs 3 and a spring arm 4 projecting from the washer at its upper end and curving downwards at one side of the washer, in rear or back thereof, and terminating in a tip or projection 5, forming a lug rectangular in cross sections and projecting forwards at an angle thereto and with its under face 6 at an incline to the edge of the washer.

In use the washer 1, is placed on a bolt 7, extending through the fish plates 8, 8' and the web of a rail 9, the legs 3 of washer 1 resting on the flange of fish plate 8' and being thereby held from turning, and a nut 10, is screwed on to the bolt 7. The arm 4 which is a tempered spring, bears against the face of the fish plate 8' and, as the nut 10 is screwed up against the washer 1, the spring arm 4 is forced outwards, which carries the tip or projection 5 past the edge of the washer and in the path of revolution of the nut 10.

It is to be noted that by the peculiar arrangement of the spring arm 4, the corner of the nut, when being screwed on the bolt, will strike the flat surface of the projection or lug 5, and force the arm 4 away from the bolt in the plane parallel to the surface of the fish-plate 8'. When, however, it is endeavor to unscrew the nut, the edge of the rectangular lug will contact with the flat side of the nut near one corner, and bite into the same. In this case the stress brought upon the arm is of such nature that it is practically all tension or shearing stress, and there will be little or no bending stress to force the arm outward. The lug thus acts as a positive lock for the backward movement of the nut.

The position of the arm 4 on the washer 1 is such that the nut 10 will readily pass under the tip or projection 5, as the nut is being screwed up on the bolt 7, the sides and corners of the nut riding under the inclined surface 6 of the tip 5, and lifting the spring arm 4, to clear the tip or projection 5. As the nut 10 is screwed up on the bolt 7, the spring arm 4 is forced outwards until the back of the spring arm 4, is even with the back of the washer, thus bringing the tip 5 into position behind the nut 10, as shown in Figs. 3 and 4. As the nut is screwed up on the bolt the tip 5 will instantly be sprung into place behind the nut by the action of spring arm 4, and resist any tendency of the nut to turn backwards. The nut when screwed to place cannot recede from its position on the bolt without forcing the spring arm outward, and the tip out of engagement with the nut. This can be done without injuring the arm, when it is desired to remove the nut. The spring arm 4 being compressed against the fish plate 8' resists the recoil caused by rail vibration. If desired the legs 3 may be dispensed with and the plate 1 extended downwards in rectangular shape to rest against the flange of a fish plate.

As will be observed from Fig. 4 of the drawing the lug 5 upon the lock washer is flat and extends at right angles from the spring arm 4 and that the said lug has a line of extent transecting the circle described by the corners of the nut 10 when rotated upon the bolt and that furthermore but one edge of the lug lies within the circle described by the said corners of the nut so that in turning the nut upon the bolt, the corners of the nut will ride along the under surface of the lug, springing the arm 4 as they pass the lug. Upon an attempt to turn the nut from the bolt, the corners of the nut will engage against that edge of the lug which lies within the circle above mentioned.

Having described the invention, I claim,

In a nut lock the combination with a bolt and nut, of a lock washer comprising a body portion having a pair of downwardly and outwardly extending arms, and a third arm extending from the body portion at a point opposite the first mentioned arm in an upward direction and thence downwardly at an angle, the said last mentioned arm being provided at its extremity with a right angularly turned flat lug having a line of extent which is a chord of the circle described by the corners of the nut when rotated, the said lug being so positioned as to have one face engaged by the corners of the nut when the same is turned on to the bolt and to engage at one edge with the faces of the nut when the same is unscrewed from the bolt, one edge of the lug lying within the circle described by the corners of the nut and the other edge lying outside the said circle.

In testimony that I claim the foregoing as my own, I have hereto affixed my signature in the presence of two witnesses.

ROBERT S. RUSH.

Witnesses:
R. C. SMALL,
L. T. McLEAN.